US009483956B2

(12) United States Patent
Lan et al.

(10) Patent No.: US 9,483,956 B2
(45) Date of Patent: Nov. 1, 2016

(54) STRINGED MUSICAL INSTRUMENT PERFORMANCE FEEDBACK SYSTEM AND METHOD

(71) Applicant: Ann R. Winget, Peoria, IL (US)

(72) Inventors: Bradley Lan, Vancouver, WA (US); Ann R. Winget, Peoria, IL (US)

(*) Notice: Subject to any disclaimer, the term of this patent is extended or adjusted under 35 U.S.C. 154(b) by 0 days.

(21) Appl. No.: 15/005,166

(22) Filed: Jan. 25, 2016

(65) Prior Publication Data

US 2016/0217703 A1    Jul. 28, 2016

Related U.S. Application Data

(60) Provisional application No. 62/107,322, filed on Jan. 23, 2015.

(51) Int. Cl.
*G10H 3/00* (2006.01)
*G09B 15/06* (2006.01)

(52) U.S. Cl.
CPC ..................... *G09B 15/06* (2013.01)

(58) Field of Classification Search
CPC .. G06F 3/016; G06F 3/0414; G06F 3/03547; G06F 3/0202; G10H 3/26; G10H 2220/301; G10H 2240/211; G10H 1/0556; G10H 2250/445; G10H 2210/091; G10H 2220/561; G10H 2220/365; G10H 3/143; G10H 2220/051; G10H 2220/056
See application file for complete search history.

(56) References Cited

U.S. PATENT DOCUMENTS

| | | | | |
|---|---|---|---|---|
| 4,852,443 A * | 8/1989 | Duncan | ................ | G10H 1/0551 200/600 |
| 5,117,730 A * | 6/1992 | Yamauchi | .............. | G10H 1/055 84/723 |
| 5,157,216 A * | 10/1992 | Chafe | ...................... | G10H 1/08 331/78 |
| 7,605,317 B2 | 10/2009 | Chen et al. | | |
| 8,173,887 B2 * | 5/2012 | Sullivan | ................. | G10H 1/342 84/724 |
| 2009/0188369 A1 * | 7/2009 | Chen | ...................... | G09B 15/00 84/281 |
| 2010/0033426 A1 * | 2/2010 | Grant | ...................... | A63F 13/06 345/156 |
| 2013/0263721 A1 * | 10/2013 | Shavit | .................... | G10H 1/055 84/626 |
| 2015/0059556 A1 * | 3/2015 | Grafman | .............. | G09B 15/002 84/485 R |

OTHER PUBLICATIONS

Tobias Grosshauser and Gerhard Troster, Finger Position and Pressure Sensing Techniques for Strings and Keyboard Instruments.
Lu Huanhuan, Computer Assisted Music Instrument Tutoring Applied to Violin Practice, National University of Singapore, 2009.
Tobias Grosshauser, Low Force Pressure Measurement: Pressure Sensor Matrices for Gesture Analysis, Stiffness Recognition and Augmented Instruments, ReactiveS Lab, Munich.
Tobias Grosshauser and Thomas Hermann, Abstract—Sensor Fusion and multi-modal Feedback for musical instrument learning and teaching; In Proceedings of the Second Vienna Talk on Music Acoustics; Vienna; Institute of Musical Acoustics; Sep. 19, 2010 to Sep. 21, 2010.

* cited by examiner

*Primary Examiner* — Marlon Fletcher
(74) *Attorney, Agent, or Firm* — Robin S. Fahlberg

(57) ABSTRACT

A real time performance pressure feedback system for a stringed instrument includes a pressure sensor, a desired pressure input device, a feedback device, and a controller. The pressure sensor is configured to be fixedly and removably attached to the stringed instrument on a pressure surface, and to generate a pressure signal indicative of a pressure being applied to the pressure surface. The desired pressure user input device is configured to receive a desired pressure input and to generate a desired pressure signal indicative of the desired pressure input. The feedback device is configured to generate feedback to a performer at least in part in response to a performance feedback signal. The controller is communicatively connected to the pressure sensor, the desired pressure user input, and the feedback device, and is configured to generate the performance feedback signal at least in part in response to the pressure signal.

20 Claims, 8 Drawing Sheets

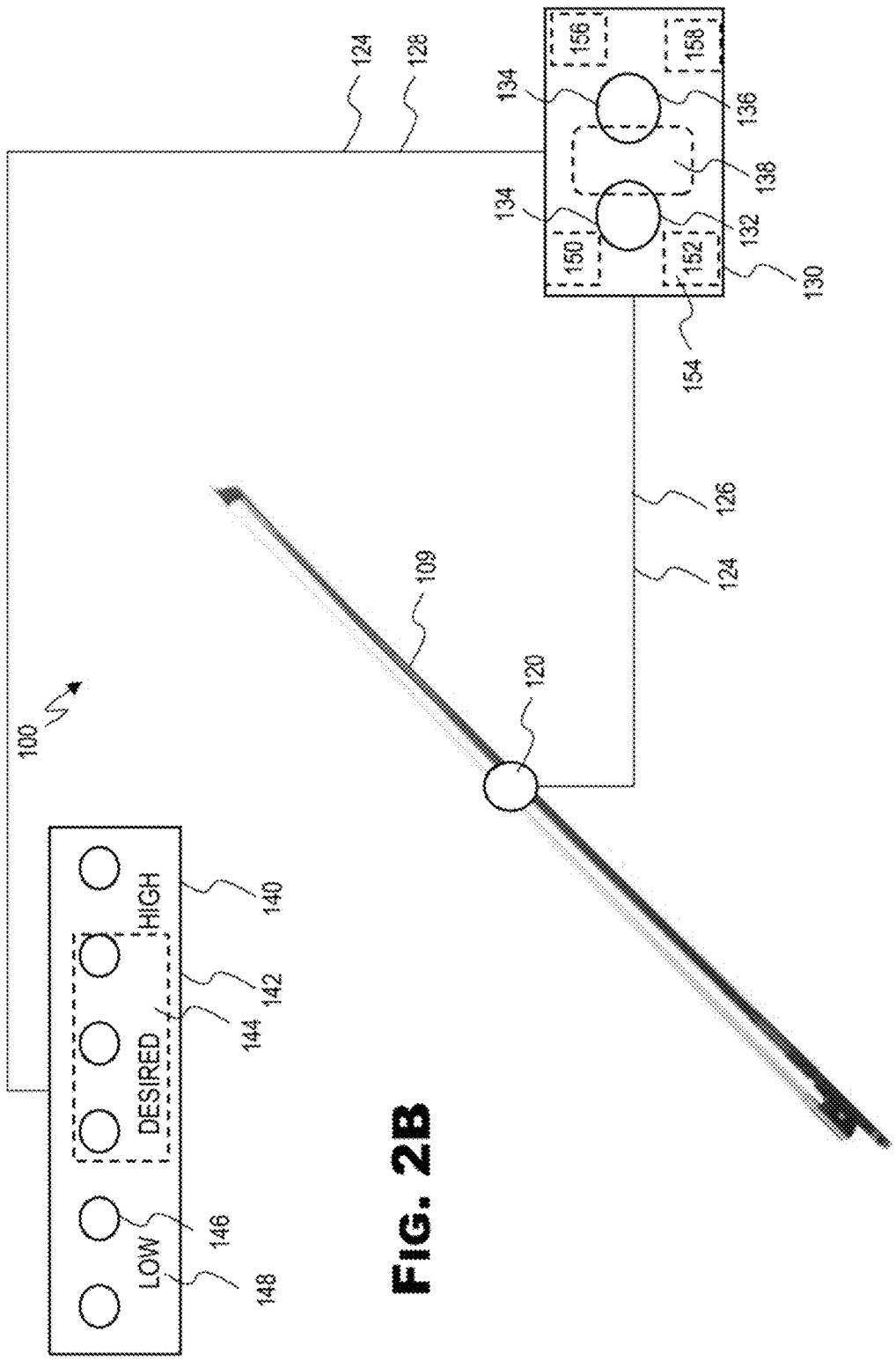

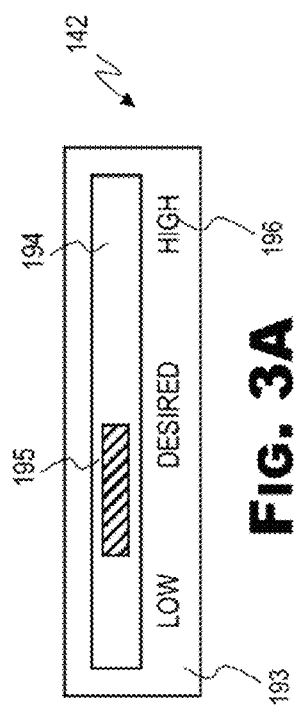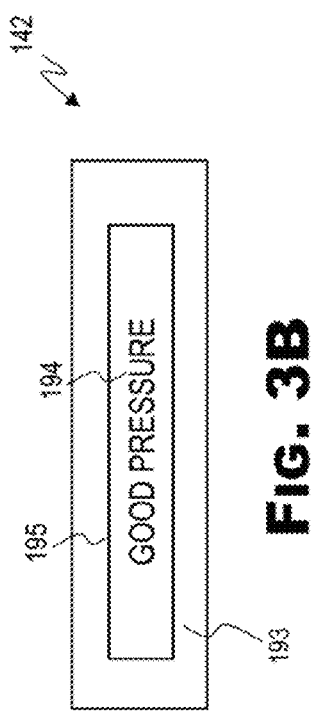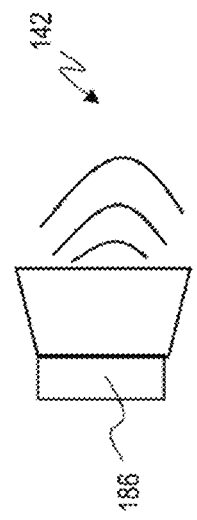

STRINGED MUSICAL INSTRUMENT PERFORMANCE FEEDBACK SYSTEM AND METHOD

PRIORITY

This application claims priority to and incorporates by reference in its' entirety, U.S. Provisional Patent Application No. 62/107,322, entitled "Stringed Instrument Performance Feedback System and Method", and filed Jan. 23, 2015.

TECHNICAL FIELD

The present invention generally relates to apparatus that provides real time performance feedback for stringed instruments; and in particular provides pressure feedback.

BACKGROUND OF THE INVENTION

When playing and/or learning to play a stringed instrument, the pressure applied by the player on the neck of the instrument with their thumb, and on the finger board with their other fingers is important to the quality of sound the instrument produces as well as the physical ease of playing. With string instruments that are supported with the chin on a chinrest, such as a violin and viola, the pressure exerted on the chinrest also affects the quality of the performance. Many students struggle with the amount of pressure to apply to the neck, the finger board, and/or the chinrest of an instrument, or are unaware that a difference in pressure would affect performance quality. Some students and/or performers experience muscular pain, nerve pain, and headaches, and sometimes even damage from applying the wrong pressure to the chinrest or neck of an instrument. Back, neck, shoulder and arm pain may be common. Some students and/or performers may decide against further study or performance on the instrument because of the pain.

Although recording systems exist, which provide feedback to musicians for evaluation after a performance, it is beneficial to have the feedback in real time as the instrument is being played. With real time feedback, a student or player is able to immediately have evaluation of the different positions and pressures applied. Some instruments have been modified with pressure sensors ingrained into the finger board to give real time feedback. However, infusing the sensors into a string instrument affects the integrity of the instrument and would not be a practical modification for the general player population. These systems lack the novelty of customizability and interchangeability across instruments.

As can be seen, there exists a motivation to provide feedback of the pressure applied to the neck, fingerboard, and/or chinrest of a stringed instrument to a performer in real time.

SUMMARY OF THE INVENTION

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

In one aspect of the present invention, a real time performance pressure feedback system for a stringed instrument includes a pressure sensor, a desired pressure input device, a feedback device, and a controller. The pressure sensor is configured to be fixedly and removably attached to the stringed instrument on a pressure surface, and to generate a pressure signal indicative of a pressure being applied to the pressure surface. The pressure surface includes at least one of a chin rest, a neck front, a neck back, and a bow. The desired pressure input device is configured to receive a desired pressure input and to generate a desired pressure signal indicative of the desired pressure input. The feedback device is configured to generate visual or audio pressure feedback to a performer playing the stringed instrument at least in part in response to a performance feedback signal. The controller is communicatively connected to the pressure sensor, the desired pressure user input, and the feedback device, and is configured to generate the performance feedback signal at least in part in response to the pressure signal.

These and other features, aspects, and advantages of the present invention will become better understood with reference to the following drawings, description and claims.

BRIEF DESCRIPTION OF THE DRAWINGS

FIG. 2B is a schematic of a second embodiment of a real time performance pressure feedback system, according to an exemplary embodiment of the invention.

FIG. 3A is a front view of a second embodiment of a feedback device, according to an exemplary embodiment of the invention.

FIG. 3B is a front view of a third embodiment of a feedback device, according to an exemplary embodiment of the invention.

FIG. 3C is a schematic view of a fourth embodiment of a feedback device, according to an exemplary embodiment of the invention.

DETAILED DESCRIPTION OF THE INVENTION

Figure 1:
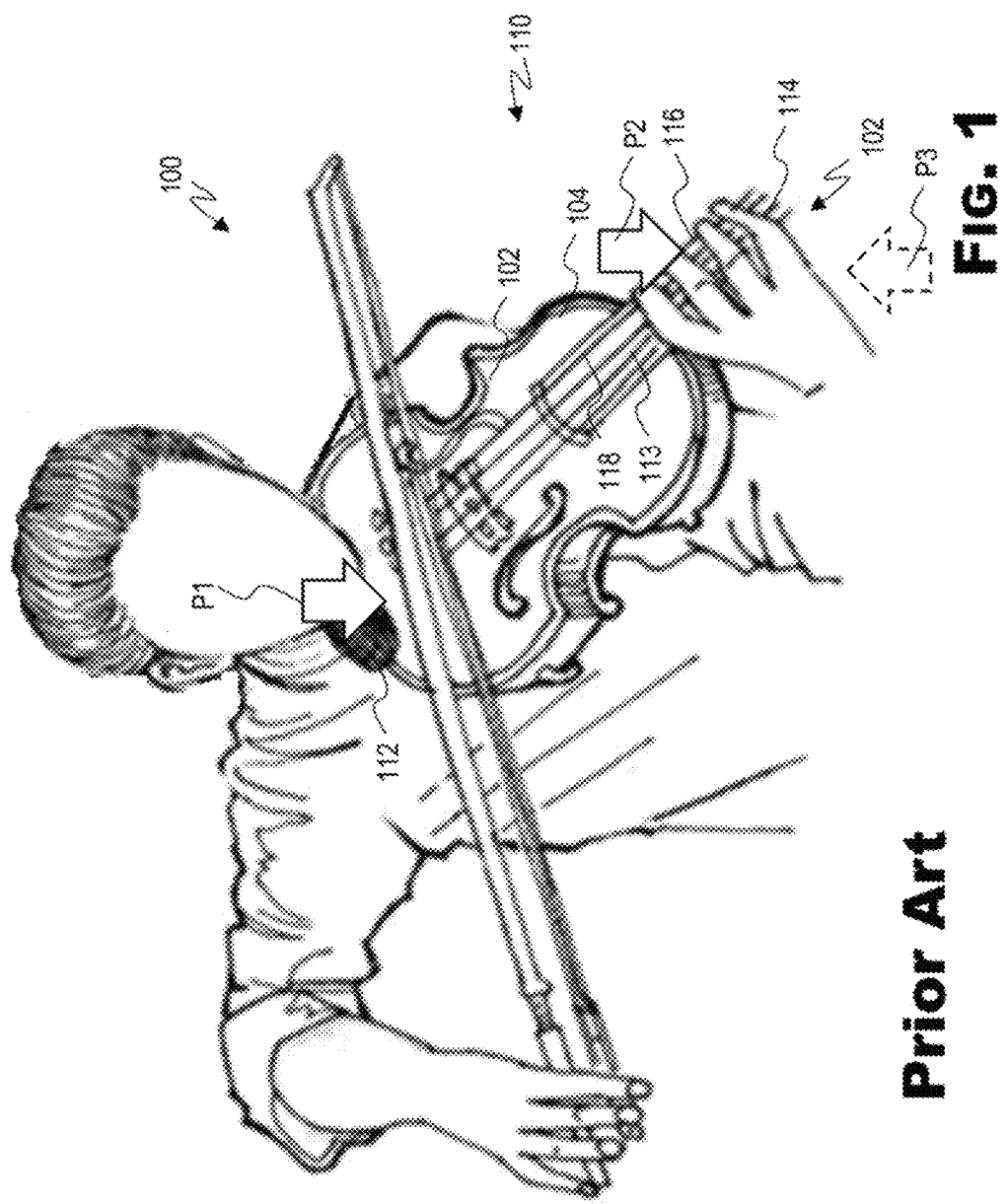
FIG. 1 is a perspective view of a person playing a traditional prior art violin.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

As will be appreciated by one skilled in the art, aspects of the present invention may be embodied as a system, method or computer program product. The whole or portions of the computer program product may be loaded on one or more memory components of an electronic device, controller, feedback device, control unit and/or combination thereof. When loaded onto the one or more memory components, the computer program product may be executable by one or more processors to cause the electronic device, controller, feedback device, control unit and/or combination thereof to perform exemplary methods described below. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage medium(s) having computer readable program code embodied thereon.

A computer readable storage medium may include, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium are the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code embodied on a computer readable storage medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language, assembly language, or similar programming languages.

The computer program code may execute entirely on at least one of the electronic device, controller, feedback device, control unit and/or combination thereof; partly on at least one of the electronic device, controller, feedback device, control unit and/or combination thereof; as a stand-alone software package; partly on the at least one of electronic device, controller, feedback device, control unit and/ or combination thereof and partly on a another remote computer device or server; or entirely on one or more remote computer devices or servers. When the program code is executed partly or entirely on remote computer devices and/or servers, the remote computer devices and/or servers may be connected to the one or more electronic device, controller, feedback device, control unit and/or combination thereof through any type of network, including a local area network (LAN) or a wide area network (WAN), or the connection may be made to an external computer (for example, through the Internet using an Internet Service Provider). In addition the net work may include Bluetooth, wireless personal area networks (WPAN), Zigbee communications, and other networks as known in the art.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, mobile electronic device, output devices, pairing server, or other programmable data processing apparatus to produce a machine, such that the instructions, which execute via the processor of the computer, mobile electronic device, output device, pairing server, or other programmable data processing apparatus, create means for implementing the functions/ acts specified in the flowchart and/or block diagram block or blocks.

These computer program instructions may also be stored in a computer readable medium that can direct a computer, mobile electronic device, output device, pairing server, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto the electronic device, controller, feedback device, control unit and/or combination thereof. The computer program instructions thus loaded may cause a series of operational steps to be performed on the electronic device, controller, feedback device, control unit and/or combination thereof. When the operational steps are performed, they may produce a computer implemented process such that the instructions which execute on the electronic device, controller, feedback device, control unit and/or combination thereof provide processes for implementing the functions/acts specified in the flowchart and/or block diagram block or blocks.

Referring now to FIG. 1, a person playing a traditional prior art stringed instrument 102, in particular a violin 102 is illustrated. The stringed instrument 102 may have one or more pressure surfaces 110 upon which the performer may apply pressure during a performance. On the violin 104, these pressure surfaces 110 may include a chin rest 112, and a neck front 114 and a neck back 116 of a neck 113. The amount of pressure a performer applies to the pressure surfaces 110 may affect the quality of the sound produced by the stringed instrument. Other stringed instrument 102 having pressure surfaces 110 may include, but is not limited to, a viola 105 (shown in relation to FIG. 2A), a guitar 106 (shown in relation to FIG. 2B), a cello 108 (shown in relation to FIG. 2B), a bass (not shown), a banjo (not shown), and a ukulele (not shown). The viola 105 may include the pressure surfaces 110 of the chin rest 112, the neck front 114, and the neck back 116. The pressure surfaces 110 on the guitar 106, the cello 108, the banjo, and the ukulele may include the neck front 114, and the neck back 116.

As the performer is playing the violin 104 he/she may put pressure on the chin rest 112 as symbolized by arrow P1 to hold the violin 104 while performing. The violin 104 may include strings 118 across which the performer draws a bow to produce a musical sound. The performer may press one or more strings 118 with his/her fingers against the neck front 114 to change the note played on the string(s) 118. The pressure applied to the neck front 114 is symbolized by arrow P2. The performer may press his/her thumb against the neck back 116 to hold the violin 104 while performing and pressing his/her fingers against the neck front 116 as symbolized by the arrow marked P3. The amount of the pressures P1, P2, P3 applied to the pressure surfaces 110 while the performer plays the violin 104 may affect the sound quality of the performance.

As a musician practices and progresses, he/she may instinctively develop the knowledge of how much pressure to apply where. However, when a student first learns to play the violin 104, it may be difficult to distinguish the affects each pressure may have on the sound of the stringed instrument 102. Other factors may also affect the sound such as how the student uses the bow. A real time pressure performance feedback system 100 (shown in relation to FIGS. 2A-2F) may assist the student in applying pressures to the pressure surfaces 110 in an optimum range.

Figure 2A:
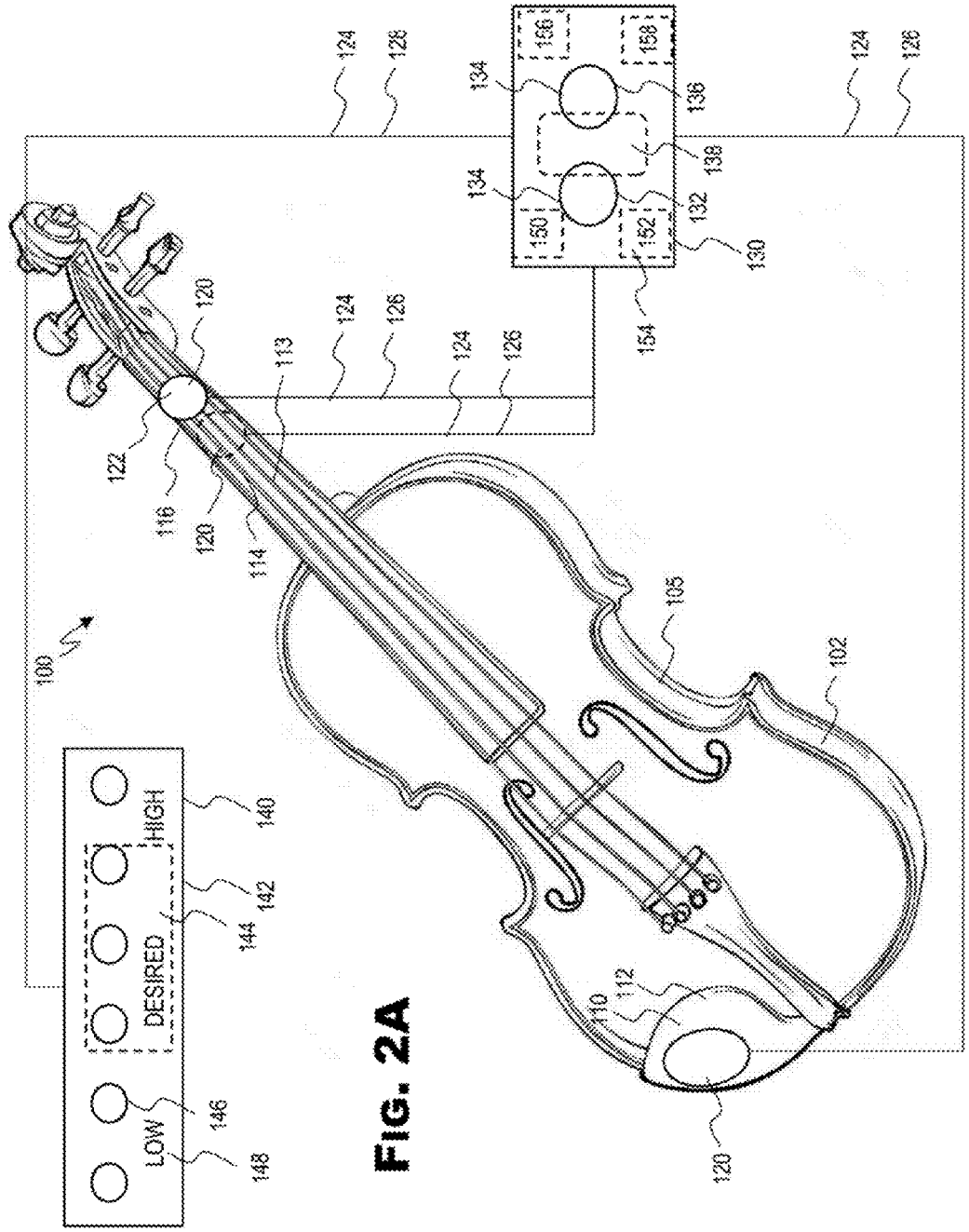
FIG. 2A is a schematic of a first embodiment of a real time performance pressure feedback system, according to an exemplary embodiment of the invention.

Referring now to FIG. 2A an exemplary first embodiment of the system 100 is illustrated in a schematic. The stringed instrument 102 illustrated is a viola 105. The system 100 includes a pressure sensor 120, a desired pressure input device 132, a feedback device 142, and a controller 144. The pressure sensor 120 is configured to be fixedly and removably attached to the stringed instrument 102 on the pressure surface 110, and to generate a pressure signal indicative of a pressure being applied to the pressure surface 110. The pressure surface 110 includes at least one of the chin rest 112, the neck front 114, and the neck back 116. The desired pressure user input device 132 is configured to receive a desired pressure input and to generate a desired pressure signal indicative of the desired pressure input. The feedback device 142 is configured to generate visual or audio pressure feedback to the performer playing the stringed instrument 102 at least in part in response to a performance feedback signal. The controller 144 is communicatively connected to the pressure sensor 120, the desired pressure user input 132, and the feedback device 142, and is configured to generate the performance feedback signal at least in part in response to the pressure signal.

The pressure sensor 120 may be a force sensing resistor, such as for example a piezoelectric sensor 122 or any pressure sensor which may produce a pressure signal indicative of the pressure being applied to the pressure surface 110. The pressure sensor 120 may be of a form which does not interfere with the playing of the stringed instrument 102 and does not affect the quality of the sound produced by the stringed instrument 102. For example, the pressure sensor 120 may be very thin such that it may fit under the strings 118 and not add bulk to the chin rest 112. The pressure sensor may include a surface material on which the performer's fingers do not slip. The pressure sensor 120 may have an adhesive side to fixed adhere the pressure sensor 120 to the stringed instrument 102. The adhesive on the adhesive side may adhere easily to the pressure surface 110 and be removed from the pressure surface 110 without undue effort. The adhesion and deadhesion of the pressure sensor 120 to the pressure surface 110 may not alter the physical integrity and appearance of the stringed instrument 102.

The pressure signal may be analogue or digital. A signal conditioner 152 may be integral to or located with the pressure sensor 120, or located elsewhere within the system 100, such as in a user interface 130 as illustrated. The pressure sensor 120 may be communicatively connected to the controller 144 through one or more communicative links 124. In the illustrated embodiment, the pressure sensor 120 is communicatively connected to the controller 144 through the user interface 130. The pressure sensor 120 may be communicatively connected to the user interface 130 through a hardwire link 126, and the user interface 130 may be communicatively connected to the controller 144 through a wireless link 128. The pressure signal may be transmitted from the pressure sensor 120 to the user interface 130 through the hardwire link 126.

The user interface 130 may be configured to be clipped to the performer's clothing, such as on a belt or a pocket with a clip 138 or other type fastener. The user interface 130 may include the desired pressure input device 132 and the sensitivity range input device 136 such that a performer may make adjustments to the desired pressure to be applied to a pressure surface 110, and the pressure sensitivity of the system 100 which may determine, at least in part, the range of pressures applied to the pressure surfaces 110 which the system 100 will provide feedback for through the feedback device 142. Only one desired pressure input device 132 and sensitivity range input device 136 are illustrated, but a person skilled in the art will realize that an additional desired pressure input device 132 and sensitivity range input device 136 may be provided on the user interface 130 for each pressure sensor 120.

Every stringed instrument 102 may be different from other stringed instruments, even in minute ways, and even if they are made to the same specifications, from similar materials, by the same manufacturer. Thus, a desired pressure on a pressure surface 110 on one stringed instrument, may not be the desired pressure on a pressure surface 110 for another stringed instrument. The pressure sensors 120 may be interchangeable on the different pressure surfaces 110 of a single instrument, but the desired pressure for the best sound may be different on the different pressure surfaces 110. The desired pressure input device 132 may allow a performer, or another person (such as an instructor), to adjust the desired pressure for a particular pressure surface 110 with a pressure sensor 120 adhered to it.

In the illustrated embodiment, the desired pressure input device 132 is illustrated as a dial. In alternative embodiments the desired pressure input device 132 may take other forms such as, but not limited to, switches, buttons, keyboards, interactive displays, levers, remote control devices, voice activated controls, menus on an electronic device such as a computer, or any other input device that a person skilled in the art would understand would be functional in the disclosed embodiments. The desired pressure may be set at a particular value, or it may be set in a range. The range may be pre-programmed or inputted through the desired pressure input device 132. The desired pressure input device 132 may generate a desired pressure signal which a processor 156 may convert to a value to be stored in a memory component 158, or the desired pressure input device 132 may adjust a component of an analogue system, such as the resistance in an adjustable resistor.

Because of the differences amongst the different types of stringed instruments 102 and between different individual stringed instruments 102, the ranges of pressures on pressure surfaces 110, which would produce a quality sound, will differ as well. For example, while pressures on a pressure surface 110 in a 3 unit range will all produce a satisfactory sound on one instrument 102, on another instrument 102, the pressures on the same or similar pressure surfaces must be in a 2 unit range for a satisfactory sound. There may also be differences in the range of pressures on a pressure surface 110 which are physically possible between instruments and pressure surfaces. The sensitivity range input device 136 may allow a performer, or another person (such as an instructor), to adjust the sensitivity of the system 100 for a particular pressure surface 110 with a pressure sensor 120 adhered to it to a desired range.

In the illustrated embodiment, the sensitivity range input device 136 is illustrated as a dial. In alternative embodiments the desired pressure input device 132 may take other forms such as, but not limited to, switches, buttons, keyboards, interactive displays, levers, remote control devices, voice activated controls, menus on an electronic device such as a computer, or any other input device that a person skilled in the art would understand would be functional in the disclosed embodiments. The desired sensitivity and thus the pressure range for feedback may be set at one particular value, or multiple values may be entered, for example one for a satisfactory pressure, one for a greater than satisfactory pressure, and one for a less than satisfactory pressure. The sensitivity range input device 136 may generate a sensitivity signal which a processor 156 may convert to a value to be stored in a memory component 158, or the sensitivity range input device 136 may adjust a range of a component of an analogue system, such as a filter. The controller 144 may be configured to modify the pressure signal at least in part in response to the sensitivity range signal.

The user interface 130 may include a receiver/transmitter 150 for receiving signals from and sending signals to other system 100 components such as the pressure sensor 120, the controller 144, and the feedback device 142. The receiver/transmitter may receive and send digital and/or analogue signals in various communication protocols as is known in the art. The receiver/transmitter 150 may receive and send signals through hardwire and wireless links, and may receive and send signals through networks such as LANS, WANS, the Internet, cellular networks, and satellite networks. The receiver/transmitter 150 may be configured to receive the pressure signal from the pressure sensor 120, and send the pressure signal (in original or a conditioned form), the desired pressure signal, and the sensitivity signal to the controller 144 and/or the feedback device 142.

The user interface 130 may include the signal conditioner 152. The signal conditioner 152 may convert one type of electronic signal into another type of signal. For example, the signal conditioner 152 may convert a signal that may be difficult to read by conventional instrumentation into a more easily read format. The signal conditioner may perform a number of functions in the conversion. The signal conversion may prepare the signal for a next stage of processing. Sensor signals, including the pressure signal may require signal conditioning before a data acquisition device, such as the user interface 130 and/or the controller 144 can effectively and accurately measure the signal. For example, thermocouple signals may have very small voltage levels that must be amplified before they can be digitized. Other sensors, such as resistance temperature detectors (RTDs), thermistors, strain gages, and accelerometers, may require excitation to operate. The signal conditioner 152 may perform all, some, or one of these preparation functions. The signal conditioner 152 may include an analogue to digital (A/D) converter 154 and/or a digital to analogue (D/A) converter, an A/D filter, a low-pass filter, a delay/buffer, or other signal conditioning components as known in the art.

In some embodiments, the user interface 130 may include a processor 156 and/or a memory component 158. These components may alternatively be located in another portion of the system 100, such as the controller 144. The processor 156 may include microprocessors or other processors as known in the art and capable of executing instructions which facilitate communication between the pressure sensor 120 and the controller 144. In some embodiments, the processor 156 in the user interface 130 may execute some or all of the instructions as illustrated and described in relation to FIG. 4, and may execute some or all of the instructions described in relation to the processor 156 located in the controller 144. In some embodiments the processor 156 may include multiple processors which may be operably connected. Such instructions may be read into or incorporated into a computer readable medium, such as the memory component 158, or provided external to processor 156. The instructions may include multiple lines or divisions of code. The lines or divisions of code may not be in consecutive order, and may not be located in the same section of code. In alternative embodiments, hard-wired circuitry may be used in place of or in combination with software instructions as described above, below, or in relation to the drawings. The memory component 158 may include computer readable storage medium as described above. In some embodiments the memory component 158 may include multiple memory components.

In the embodiment illustrated, the system 100 includes a control unit 140 with the controller 144 and the feedback device 142. The controller 144 may receive the pressure signal, the desired pressure signal, and the sensitivity signal from the user interface 130 through wireless link 128. The controller 144 may generate the feedback signal, at least in part, in response to the pressure signal, the desired pressure signal, and the sensitivity signal. The feedback signal may be indicative of whether the pressure applied to the pressure surface 110 is satisfactory or unsatisfactory. If the pressure applied to the pressure surface 110 is unsatisfactory, the feedback signal may be indicative of whether the pressure applied to the pressure surface 110 is greater than or less than the desired pressure, and may also indicate a level of over pressure or under pressure in relation to the desired pressure. If the desired pressure includes a desired pressure range, the feedback signal may be indicative of whether the pressure applied to the pressure surface 110 is in the lower half or the upper half of the desired pressure range. The controller 144 may transmit the feedback signal to the feedback device 142. The controller 144 is more fully illustrated and described in relation to FIG. 2B.

The feedback device 142 may be any device which provides feedback to the performer on the pressure the performer applies to the pressure surface 110. The feedback provided by the feedback device may be visual, or it may be audio. In the embodiment illustrated, the feedback device provides visual feedback through six light emitting diodes (LEDs) 146. Text labels 148 may be provided to indicate to the performer what the lighting (or non-lighting) of the LEDs 146 indicates. In the illustration only one array of LEDs 146 is shown to give feedback for pressure on one pressure surface 110. In alternative embodiments, an additional array of LEDs 146 may be provided for each pressure sensor 120.

In an exemplary scheme for the feedback device 142, the number of LEDs 146 lit, indicates the feedback. The desired pressure signal and the desired sensitivity signal may indicate a desired pressure range, a less than desired pressure range, and a greater than desired pressure range. When the first LED 146 or the first and second LEDs 146 are lit, it may indicate that the pressure applied to the pressure surface 110 is in the less than desired pressure range. If the first LED 146 is lit it may indicate that the pressure applied to the pressure surface 110 is in the lower half of the less than desired pressure range. If the first and second LEDs 146 are lit it may indicate that the pressure applied to the pressure surface 110 is in the upper half of the less than desired pressure range When the first through third LEDs 146 or the first through fourth LEDs 146 are lit, it may indicate that the pressure applied to the pressure surface 110 is in the desired pressure range. If the first through third LEDs 146 are lit it may indicate that the pressure applied to the pressure surface 110 is in the lower half of the desired pressure range. If the first through fourth LEDs 146 are lit it may indicate that the pressure applied to the pressure surface 110 is in the upper half of the desired pressure range. When the first through fifth LEDs 146 or the first through sixth LEDs 146 are lit, it may indicate that the pressure applied to the pressure surface 110 is greater than the desired pressure range. If the first through fifth LEDs 146 are lit it may indicate that the pressure applied to the pressure surface 110 is in the lower half of the greater than desired pressure range. If the first through sixth LEDs 146 are lit it may indicate that the pressure applied to the pressure surface 110 is in the upper half of the greater than desired pressure range. A person skilled in the art will realize that there are alternative embodiment schemes of lighting the six LEDs, and alternative embodiment text labels 148 that may be used to give a performer feedback. Alternative visual and audio feedback devices 142 are also contemplated, and some alternative embodiments are illustrated and described in relation to FIGS. 3A-3C.

Referring now to FIG. 2B an exemplary second embodiment of the system 100 is illustrated in a schematic. Similar components to the first embodiment of the system 100 illustrated in FIG. 2A are labeled with similar element numbers and only differences and additions may be described. In this embodiment, the pressure sensor 120 is fixedly and removably attached to the bow 109.

Figure 2C:
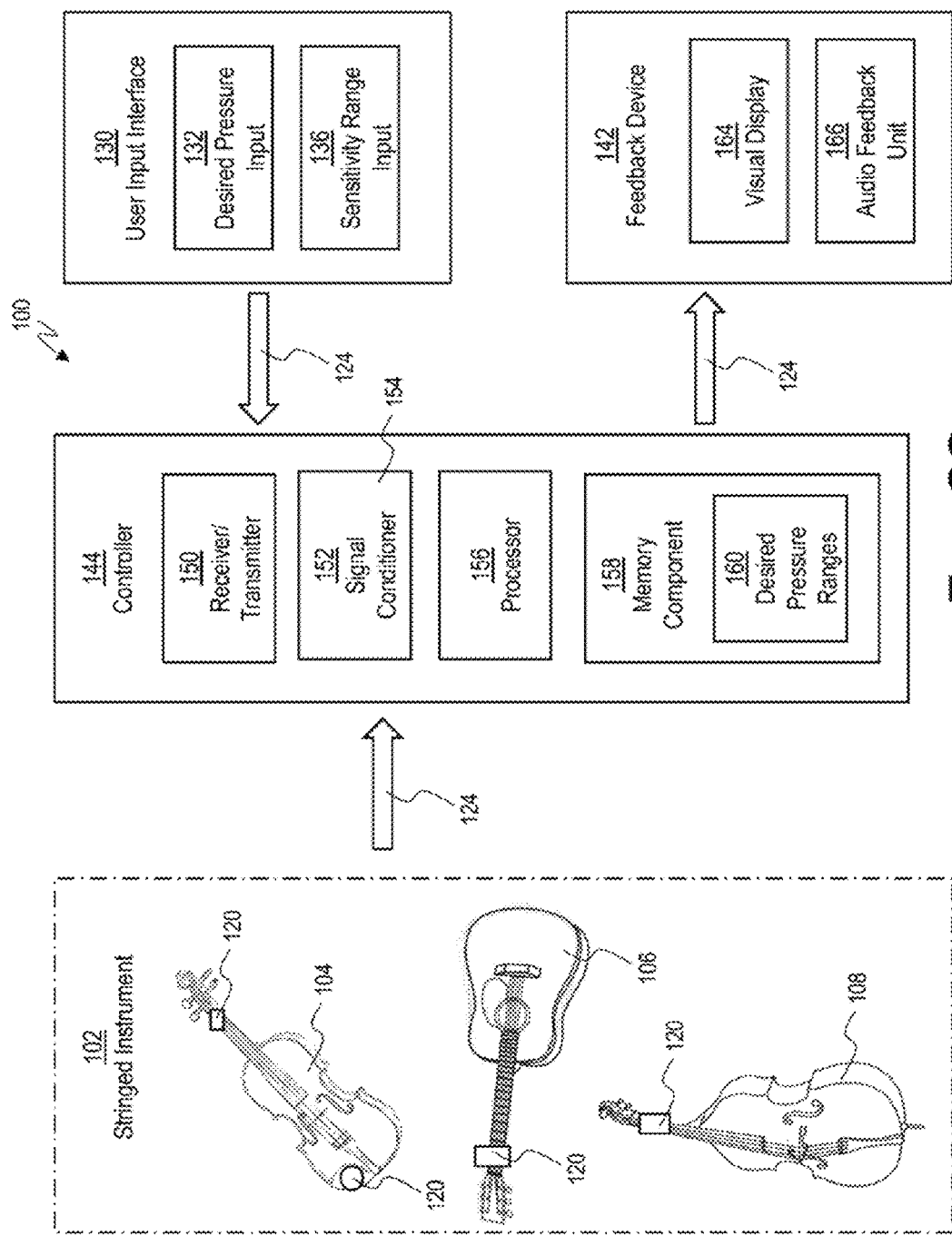
FIG. 2C is a schematic of a third embodiment of a real time performance pressure feedback system, according to an exemplary embodiment of the invention.

Referring now to FIG. 2C an exemplary third embodiment of the system 100 is illustrated in a schematic. In this embodiment, one or more pressure sensors 120 are communicatively linked through communicative link 124 to the controller 144. The user interface 130 and the feedback device 142 are also communicatively linked through communicative link 124 to the controller 144. The exemplary stringed instruments 102 illustrated are the violin 104, the guitar 106, and/or the cello 108. The pressure surface 110 may include the chinrest 112, the neck front 114, and/or the neck back 116.

The controller 144 may include the receiver/transmitter 150, the signal conditioner 152, the processor 156, and the memory component 158. The signal conditioner 152 may include the A/D converter 154. The memory component 158 may include desired pressure ranges 160 which may be determined from the desired pressure signal and the sensitivity signal. Alternatively, the desired pressure ranges 160 may be predetermined default values. The receiver/transmitter 150 may include any device for receiving signals from and sending signals to other system 100 components such as the pressure sensor 120, the user interface 130, and the feedback device 142. The receiver/transmitter 150 may be configured to receive the pressure signal from the pressure sensor 120, the desired pressure signal and the sensitivity signal from the user interface 130, and to transmit the feedback signal to the feedback device 142. The signal conditioner 152 may condition signals sent from the pressure sensor 120, and the user interface 130 for use by the processor 156 in executing coded instructions. The signal conditioner 152 may also condition signals sent to and used by the feedback device 142. The processor 156 and memory component 158 are as described in relation to FIG. 2A.

Figure 2E:
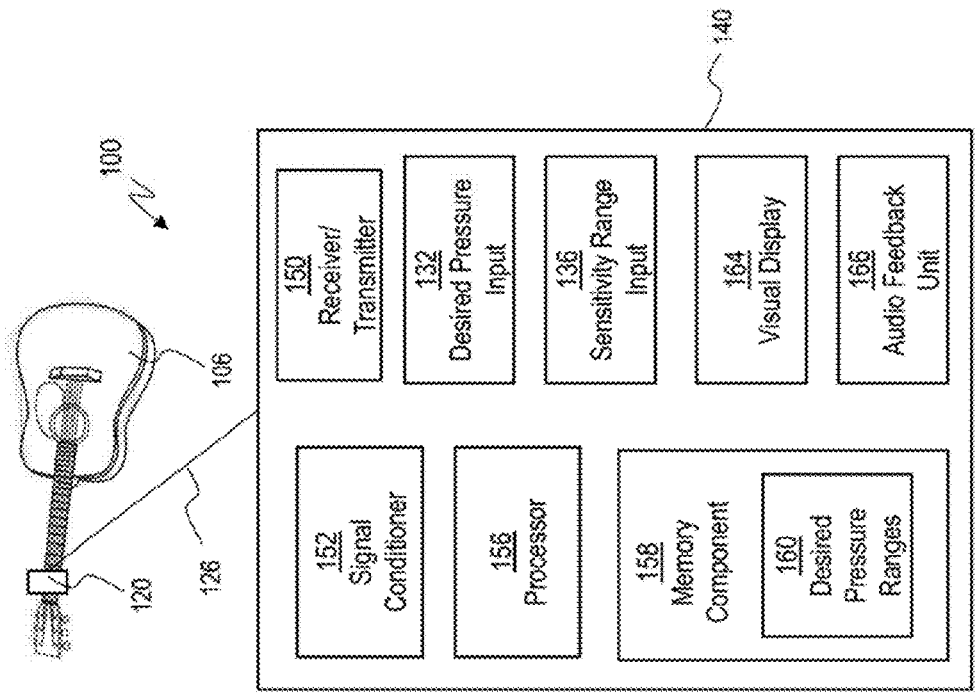
FIG. 2E is a schematic of a fifth embodiment of a real time performance pressure feedback system, according to an exemplary embodiment of the invention.
Figure 2D:
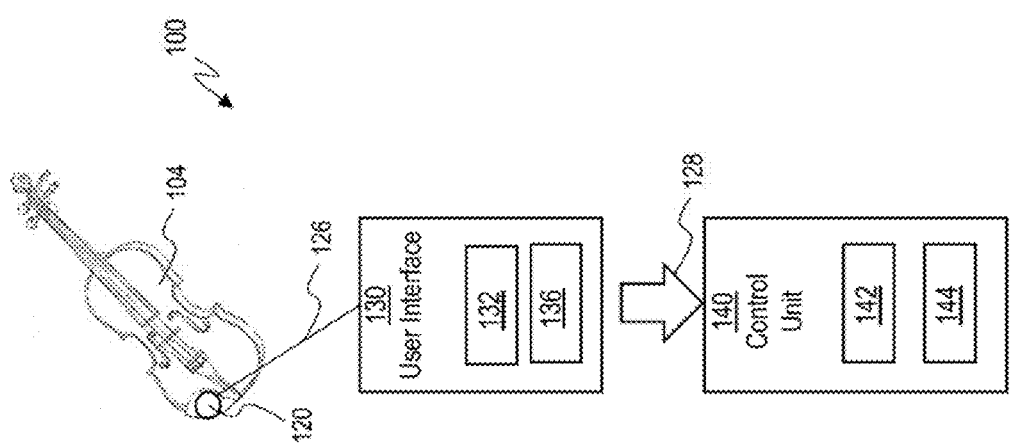
FIG. 2D is a schematic of a fourth embodiment of a real time performance pressure feedback system, according to an exemplary embodiment of the invention.

Referring now to FIG. 2D an exemplary fourth embodiment of the system 100 is illustrated in a schematic. The fourth embodiment differs from the first embodiment in FIG. 2A in that the stringed instrument illustrated is a violin 104 and the pressure surface 110 is limited to the chinrest 112.

Referring now to FIG. 2E an exemplary fifth embodiment of the system 100 is illustrated in a schematic. In the fifth embodiment, the control unit 140 includes all the components of the controller 144, the user interface 130, and the feedback device 148 of the first embodiment of FIG. 2A in one unit communicatively connected to the pressure sensor 120 through a hardwire connection 126. The stringed instrument 102 is illustrated as a guitar 106, and the pressure surface 110 is illustrated as one or both of the neck front 114 and the neck back 116.

Figure 2F:
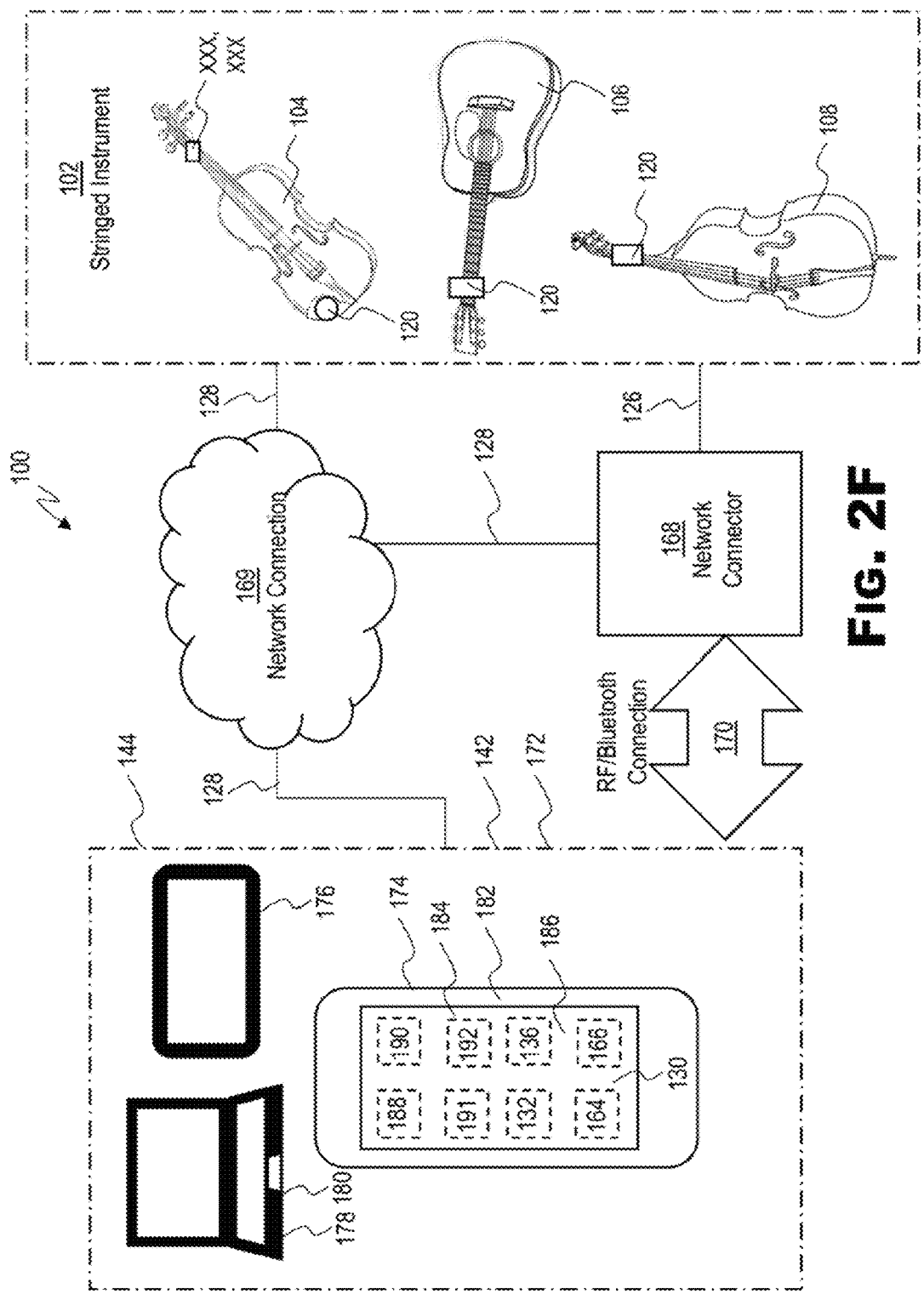
FIG. 2F is a schematic of a sixth embodiment of a real time performance pressure feedback system, according to an exemplary embodiment of the invention.

Referring now to FIG. 2F an exemplary sixth embodiment of the system 100 is illustrated in a schematic. In the sixth embodiment, the controller 144, user interface 130, and feedback device 142 are embodied in an electronic device 172. The electronic device 172 may include any computing device. Non-limiting examples of mobile electronic device 172 include mobile phones 174, electronic tablets 176, and computers 108—including laptop computers 180. The electronic device 172 may include a housing 182 and a user interface 130. The user interface 130 may include a display 184 for displaying information to a user, and input devices for allowing the user to make enter desired commands or information. In the illustrated embodiment, the display and input devices are combined in an interactive touchscreen 186. However, the display and user input devices may take many forms. The display may, for example include a liquid crystal display (LCD), a LED display, or the like. In addition to the touchscreen, non-limiting examples of the user input devices include keyboards, voice activated input devices, buttons, dials, switches, breath activated devices and the like for physically handicapped users, and/or other devices that allow a user to input desired commands and/or information.

The electronic device 172 may include a processor 190, and a memory component 191. The processor 190 may include microprocessors or other processors as known in the art and capable of executing instructions, as described below and in relation to FIG. 4. In some embodiments, the processor 190 may include multiple processors which may be operably connected. Such instructions may be read into or incorporated into a computer readable medium, such as the memory component 191, or provided external to processor 190. The instructions may include multiple lines or divisions of code. The lines or divisions of code may not be in consecutive order, and may not be located in the same section of code. In alternative embodiments, hard-wired circuitry may be used in place of or in combination with software instructions as described above, below, or in relation to the drawings. The memory component 191 may include computer readable storage medium as described above. In some embodiments the memory component 118 may include multiple memory components.

The electronic device 172 may include an operating system, and may run various types of application software, sometimes referred to as apps. The electronic device 172 may also include features like a camera, and a media player feature for video and/or music files. The electronic device 172 may also include a power supply (not shown) which may include batteries or other power storage devices, and/or a port to connect to an AC or DC power supply.

The electronic device 172 may download an app or other software which configures the electronic device 172 to comprise the user interface 130, the controller 144, and the feedback device 142. In another embodiment, software to configure the electronic device 172 to comprise the user interface 130, the controller 144, and the feedback device 142 may be pre-loaded on the electronic device at the manufacturer. The app or software may be downloaded in anyway known in the art.

The electronic device 172 may include a receiver/transmitter 188 to allow the electronic device 172 to send and receive data from other electronic and computer devices through communicative links 124. The receiver/transmitter 188 may allow the electronic device 172 to send and receive data from hardwire links 126, wireless links 128, network connections 169, and short-range wireless links 170. The receiver/transmitter 188 may include hardware and/or software internal to the electronic device 172 and/or receivers and transmitters which may be connected to the electronic device at ports. For example, a short range receiver configured to receive the pressure signal from the pressure sensor 120 may be attached to a USB port or other port. The receiver/transmitter 188 may allow the electronic device 172 to communicate using multiple types of communication methods, links, and protocols. Non-limiting examples of networks the communication module 128 may support include wireless networks, data or packet networks, publicly switched telephone networks (PSTN), cellular networks, wide area networks (WAN), and adjacent local area networks (LAN).

The processor 190 may execute instructions from the memory component 191 which allows the electronic device 172 to receive the desired pressure input and the sensitivity input through the desired pressure input device 132 and the sensitivity range input device 136 embodied in the interactive touchscreen 186 or other input device of the electronic device 172. The interactive touchscreen 186 or other display 193 may embody the visual display 164 of the feedback device 142. Speakers internal to the electronic device 172 or connected to the electronic device 172 may embody the audio feedback unit 166 of the feedback device 142.

The pressure sensor 120 may be communicatively connected to a network connector 168 through a hardwire link 126. The network connector 126 may communicatively connect the pressure sensor 120 to the electronic device 172 through a network connection 169 or a short range connection 170. The short range connection may, for example include a RF connection or a Bluetooth connection.

INDUSTRIAL APPLICATION

Figure 4:
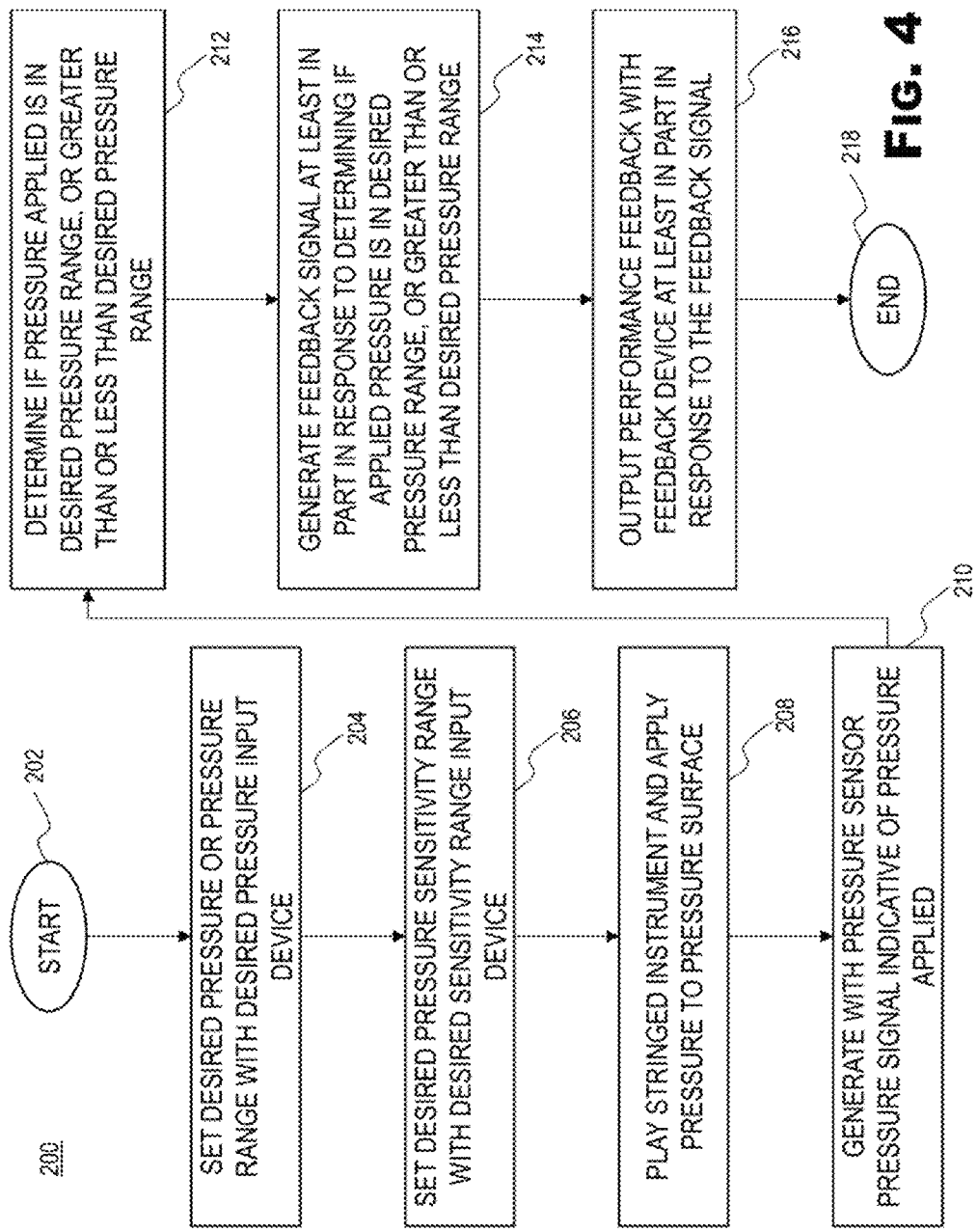
FIG. 4 is a flow chart of a method of providing pressure feedback to a performer of a stringed instrument, according to an exemplary embodiment of the invention.

Referring now to FIG. 4, a flow chart of a method 200 of providing pressure feedback to a performer of a stringed instrument is illustrated. The method 200 starts at step 202. A performer or other person may input a desired pressure or pressure range for pressure to be applied to a pressure surface 110 of a stringed instrument with a desired pressure input device. The desired pressure or pressure range may be a value or range at which the stringed instrument will generate the best quality sound. The desired pressure input device 132 may generate a desired pressure signal (step 204). The performer or other person may also input a desired sensitivity range. The sensitivity range may include a range of pressures for the system 100 to provide feedback on when applied to the pressure surface 110 of the stringed instrument. The sensitivity range input may be entered with a sensitivity range input device. The sensitivity range may be a pressure range that would be expected to be applied to the pressure surface. The sensitivity range input device may generate a sensitivity signal indicative of the desired sensitivity range (step 206).

A performer may apply pressure to the pressure surface 110 while playing the stringed instrument 102. For example, the performer may apply pressure to the chinrest 112 with their chin to hold the violin 104 or viola 105 (step 208). The pressure sensor 120 may generate a pressure signal indicative of the pressure applied to the pressure surface 110 (step 210). The pressure signal may be transmitted to and received by the controller 144. The pressure signal may also be conditioned by the signal conditioner 152, in some embodiments internal to the controller 144. The controller 144 may determine if the pressure applied to the pressure surface 110 is in the desired pressure range, greater than the desired pressure range, or less than the desired pressure range at least in part in response to the pressure signal, the desired pressure signal, and the sensitivity signal (step 212).

The controller 144 may generate a feedback signal, at least in part in response to determining if the pressure applied to the pressure surface 110 is in the desired pressure range, greater than the desired pressure range, or less than the desired pressure range (step 214). The feedback device 142 may output performance feedback, at least in part in response to the feedback signal. The feedback may be visual or audio (step 216). The feedback may allow the performer to either continue playing the stringed instrument in the current manner, or to alter the pressure applied to one or more pressure surfaces 110.

It should be understood, of course, that the foregoing relates to exemplary embodiments of the invention and that modifications may be made without departing from the spirit and scope of the invention as set forth in the following claims.

We claim:

1. A real time performance pressure feedback system for a stringed instrument, comprising:
   a pressure sensor configured to be fixedly and removably attached to the stringed instrument on a pressure surface, the pressure surface including at least one of a chin rest, a neck front, a neck back, and a bow, and configured to generate a pressure signal indicative of a pressure being applied to the pressure surface;
   a sensitivity range user input device configured to receive a sensitivity range input and generate a sensitivity range signal at least in part in response to the sensitivity range input;
   a desired pressure input device configured to receive a desired pressure input and configured to generate a desired pressure signal indicative of the desired pressure input;
   a feedback device configured to generate visual or audio pressure feedback to a performer playing the stringed instrument at least in part in response to a performance feedback signal; and
   a controller communicatively connected to the pressure sensor, the sensitivity range input device, the desired pressure user input, and the feedback device, and configured to modify the pressure signal at least in part in response to the sensitivity range signal, and generate the performance feedback signal at least in part in response to the modified pressure signal.

2. The system of claim 1, wherein the desired pressure input includes a desired pressure range.

3. The system of claim 1, wherein the pressure sensor includes a piezoelectric sensor.

4. The system of claim 1, wherein the performance feedback signal is indicative of the pressure signal being in one of a satisfactory range and an unsatisfactory range.

5. The system of claim 4, wherein the unsatisfactory range includes a high range and a low range, and the performance feedback signal is indicative of the pressure signal being in one of the satisfactory range, the high range, and the low range.

6. The system of claim 4,
wherein the satisfactory range and the unsatisfactory range are determined at least in part in response to the sensitivity range signal.

7. The system of claim 1, wherein the feedback device includes multiple light emitting diodes (LEDs) and one or more of the LEDs are turned on in response to the performance feedback signal.

8. The system of claim 1, wherein the feedback device includes a display screen, and the display screen displays information in text and/or graphics indicative of the pressure signal being in one of a satisfactory range and an unsatisfactory range.

9. The system of claim 1, wherein the feedback device includes an audio device, and the audio device generates sounds indicative of the pressure signal being in one of a satisfactory range and an unsatisfactory range.

10. The system of claim 1, wherein the pressure surface includes the chin rest.

11. The system of claim 1, wherein the pressure surface includes the neck front in an area where fingers of the performer press to produce desired notes.

12. The system of claim 1, wherein the pressure surface includes the neck back in an area where a thumb of the performer presses while playing the instrument.

13. The system of claim 1, wherein the stringed instrument includes a violin.

14. The system of claim 1, wherein the stringed instrument includes a guitar and the pressure surface includes one of the neck front and the neck back.

15. The system of claim 1, wherein the stringed instrument includes a cello and the pressure surface includes one of the neck front and the neck back.

16. The system of claim 1, wherein the feedback device includes a display on an electronic device, and the electronic device includes one of a mobile phone, an electronic tablet, and a computer.

17. The system of claim 1, wherein the feedback device is communicatively connected to the controller, at least in part, through a wireless connection.

18. The system of claim 1, wherein the pressure sensor is communicatively connected to the controller, at least in part, through a wireless connection.

19. The system of claim 1, wherein the pressure sensor is communicatively connected to the controller, at least in part, through a hard wire connection.

20. A real time performance pressure feedback system for a stringed instrument, comprising:
a pressure sensor configured to be fixedly and removably attached to the stringed instrument on a pressure surface, the pressure surface including at least one of a chin rest, a neck front, a neck back, and a bow, and configured to generate a pressure signal indicative of a pressure being applied to the pressure surface;
a desired pressure input device configured to receive a desired pressure input and configured to generate a desired pressure signal indicative of the desired pressure input;
a feedback device configured to generate visual or audio pressure feedback to a performer playing the stringed instrument at least in part in response to a performance feedback signal; and
a controller communicatively connected to the pressure sensor, the desired pressure user input, and the feedback device, and configured to generate the performance feedback signal at least in part in response to the pressure signal, the performance feedback signal indicative of the pressure signal being in one of a satisfactory range, a high range, and a low range.

* * * * *